United States Patent
Smith et al.

(10) Patent No.: US 10,541,831 B2
(45) Date of Patent: Jan. 21, 2020

(54) CONTROL SYSTEM AND NETWORK ARCHITECTURE FOR FLUIDIC CONTROL SYSTEMS

(71) Applicant: Eaton Intelligent Power Limited, Dublin (IE)

(72) Inventors: Stephen Darrell Smith, Plymouth, MN (US); Chris William Schottler, Chanhassen, MN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 39 days.

(21) Appl. No.: 15/895,448

(22) Filed: Feb. 13, 2018

(65) Prior Publication Data

US 2018/0234262 A1  Aug. 16, 2018

Related U.S. Application Data

(60) Provisional application No. 62/458,938, filed on Feb. 14, 2017.

(51) Int. Cl.
*H04L 12/40* (2006.01)
*F15B 13/044* (2006.01)
*G05D 16/20* (2006.01)

(52) U.S. Cl.
CPC ............ *H04L 12/40* (2013.01); *F15B 13/044* (2013.01); *G05D 16/2006* (2013.01); *H04L 2012/40215* (2013.01)

(58) Field of Classification Search
CPC .......... H04L 12/40; H04L 67/12; F15B 13/04; F15B 13/044; G05D 16/2006

(Continued)

(56) References Cited

U.S. PATENT DOCUMENTS

| 2,286,880 A | * | 6/1942 | Traut | ............ F15B 21/00 |
| | | | | 137/596.14 |
| 2,651,324 A | | 9/1953 | Hodgson et al. | |
| 3,620,294 A | * | 11/1971 | Hetzel | ............ B22D 18/06 |
| | | | | 164/155.4 |

(Continued)

OTHER PUBLICATIONS

Extended European Search Report for Application No. 18156195.2 dated Jun. 21, 2018.
PVG 32 Proportional Valve Group, Danfoss, Mar. 2016.

*Primary Examiner* — Paul R. Myers
(74) *Attorney, Agent, or Firm* — Merchant & Gould P.C.

(57) ABSTRACT

The present disclosure describes a control system network architecture for a fluidic control system such as a hydraulic or pneumatic control system. The architecture includes a plurality of clustered control-component nodes with each node being alternatively configurable to independently control the operation of multiple single-acting controlled endpoint devices or a double-acting controlled endpoint device. Each node includes control-components including a solenoid, one or more valve spools independently controllable by the solenoid, and a low-level controller operable to control the solenoid. The solenoid, valve spools, and low-level controller are clustered together and physically co-located as a unit. The nodes are arranged in a control block with each node being uniquely identifiable for data communication via a data communication network. The data communication network may include a Controller Area Network (CAN). Multiple control blocks may be equipped with communication modules and linked for data communication between the control blocks.

24 Claims, 3 Drawing Sheets

(58) Field of Classification Search
USPC .............................. 137/624.12, 101.19, 119.1
See application file for complete search history.

(56) References Cited

U.S. PATENT DOCUMENTS

| | | | | |
|---|---|---|---|---|
| 4,714,299 A | * | 12/1987 | Takata | B60T 8/1766 188/181 A |
| 5,255,651 A | * | 10/1993 | Wakasa | F02D 1/12 123/198 D |
| 5,653,155 A | * | 8/1997 | Hausman | E02F 3/844 91/508 |
| 5,809,024 A | * | 9/1998 | Ferguson | H04Q 11/0478 370/395.53 |
| 6,185,466 B1 | | 2/2001 | Nicewonger | |
| 6,226,581 B1 | * | 5/2001 | Reimann | B60T 8/172 701/36 |
| 7,016,366 B2 | | 3/2006 | Kawarai | H04L 47/10 370/389 |
| 2001/0037724 A1 | * | 11/2001 | Schumacher | F15B 15/2838 91/363 R |
| 2004/0249538 A1 | * | 12/2004 | Osaki | B66F 9/24 701/50 |
| 2005/0076958 A1 | * | 4/2005 | Foster | F15B 21/005 137/596 |
| 2006/0064215 A1 | * | 3/2006 | Turski | B60W 50/00 701/41 |
| 2006/0272704 A1 | * | 12/2006 | Fima | E03B 7/071 137/12 |
| 2006/0272710 A1 | | 12/2006 | Minervini et al. | |
| 2006/0287777 A1 | * | 12/2006 | Katrak | B22D 18/06 164/155.4 |
| 2007/0025122 A1 | * | 2/2007 | Zub | H03K 17/08 363/16 |
| 2007/0187438 A1 | | 8/2007 | Phallen et al. | |
| 2009/0306832 A1 | * | 12/2009 | Lu | H03K 17/08 363/16 |
| 2011/0056194 A1 | * | 3/2011 | Wojcicki | F15B 15/2838 91/363 R |
| 2013/0310951 A1 | * | 11/2013 | Fisher | H04Q 11/0478 370/395.53 |
| 2016/0265520 A1 | * | 9/2016 | Skinner, Jr. | H04L 47/10 370/389 |

\* cited by examiner

CONTROL SYSTEM AND NETWORK ARCHITECTURE FOR FLUIDIC CONTROL SYSTEMS

CROSS-REFERENCE TO RELATED APPLICATIONS

The present disclosure claims priority to U.S. Provisional Patent Application No. 62/458,938 filed Feb. 14, 2017, the disclosure of which is hereby incorporated by reference in its entirety.

FIELD OF THE INVENTION

The present invention relates generally to the field of control systems and, more particularly, to control system network architectures for fluidic control systems such as hydraulic or pneumatic control systems.

BACKGROUND

Today, the operation of many hydraulic and pneumatic systems in vehicles, heavy equipment, or other applications is controlled by control systems employing Controller Area Networks (CANs) having centralized or decentralized architectures. In a centralized Controller Area Network (CAN) architecture, a central controller of a hydraulic or pneumatic system presents information to and receives input information from an operator via a human machine interface (HMI) device. The central controller also receives input information in the form of data collected by various sensors located in strategic locations of the system. Acting under the control of software executed by the central controller and using the input information, the central controller communicates appropriate analog signals via the Controller Area Network (CAN) to solenoids, switches, and similar devices that are connected to or integrated with controlled system components such as valves, pumps, and other controlled components. For example, after receiving appropriate input information such as data representative of joystick movement, a central controller may communicate analog signals to a solenoid of a valve causing operation of the valve as required to operate a single service such as extending or retracting a hydraulic cylinder or causing rotation of a hydraulic motor.

In a centralized Controller Area Network (CAN) architecture, an extensive amount of wiring is necessary to electrically connect the central controller with human machine interface (HMI) devices, sensors, and controlled components. The cost of such wiring depends on a number of factors (including, at least, the lengths of the wires, required wire protection, and routing difficulty). Also, because the wiring is extensive, it is prone to wiring mistakes (such as, but not limited to, connecting wires to the wrong components) and provides a large number of possible locations for failures. Additionally, since the central controller and controlled components are, typically, not assembled and tested together until final assembly on/in the machine, device, or system in/with which they are used, final calibrations and adjustments (including, without limitation, establishing jump-to currents, and setting limits and shaping characteristics) must be made during final assembly of the hydraulic or pneumatic system.

In contrast to a centralized Controller Area Network (CAN) architecture, system control and communication capabilities are distributed and are located at controlled components in a decentralized Controller Area Network (CAN) architecture. The controlled components each have a local controller which can communicate on the Controller Area Network (CAN). Control software is executed by the local controller and signals are output from the local controller to solenoids, switches, and similar devices of a controlled component to cause appropriate operation of such devices and, hence, of the controlled component. Because the control software is executed locally, calibrations may be performed before final assembly of the hydraulic systems of which the controlled components are a part, thereby making the controlled components "ready-to-run" and requiring little, if any, post-assembly calibrations. Also, due to the co-location of the local controllers and proximity to local sensors, the controlled components are, generally, capable of greater software configurability and wiring is minimized, thereby significantly reducing wiring costs and reducing the number of locations for potential failures to occur. While a decentralized Controller Area Network (CAN) architecture provides such benefits, use of the architecture suffers from the cost associated with each controlled component having its own electronics including a printed circuit board assembly configured with a digital signal processor, Controller Area Network (CAN) communication hardware, current drivers, and, possibly, sensors.

Therefore, there is a need in the industry for a network architecture for controlling the operation of hydraulic, pneumatic, and other systems that provides enhanced local control, minimal calibration, and reduced wiring similar to a decentralized Controller Area Network (CAN) architecture, that minimizes the cost of controlled components similar to a centralized Controller Area Network (CAN) architecture, and that addresses these and other problems, issues, deficiencies, or shortcomings of present Controller Area Network (CAN) architectures.

SUMMARY

Broadly described, the present disclosure relates to a control system network architecture, including apparatuses and methods, for a fluidic control system such as, but not limited to, a hydraulic or pneumatic control system. In one inventive aspect, the control system network architecture comprises a plurality of clustered control-component nodes with each node being optionally configurable to independently control the operation of multiple single-acting controlled endpoint devices or a double-acting controlled endpoint device. In another inventive aspect, the control system network architecture comprises a clustered control-component node including one or more valve spools independently controllable by a local, low-level controller. In still another inventive aspect, the control system network architecture comprises a solenoid, one or more valve spools independently controllable by the solenoid, and a local, low-level controller operable to control the solenoid clustered, or grouped, and physically co-located together as a unit. In still another inventive aspect, the control system network architecture comprises a plurality of clustered control-component nodes arranged together with each node being uniquely identifiable for the communication of data via a data communication network. In some examples, the data communication network comprises a Controller Area Network (CAN).

In one aspect, the disclosed technology relates to a control system network architecture for a fluidic control system, said control system network architecture comprising: a plurality of nodes adapted to control fluid flow to a plurality of controlled endpoint devices, each node of said plurality of nodes is configurable to independently control fluid flow to multiple single-acting controlled endpoint devices or to a double-acting controlled endpoint device. In some examples, each node of said plurality of nodes comprises a solenoid, a plurality of valve spools independently controllable by said solenoid, and a local controller operable to control said solenoid. In some examples, the solenoid, said one or more valve spools, and said local controller are co-located physically. In some examples, the solenoid is embodied in a pilot valve. In other examples, the solenoid is in a direct-acting valve. In some examples, each node of said plurality of nodes is uniquely identifiable for communication of data via a data communication network. In some examples, said data communication network comprises a Controller Area Network (CAN). In some examples, each node of said plurality of nodes is daisy-chainable for data communication with other nodes of said plurality of nodes. In some examples, each node of said plurality of nodes is individually addressable for data communications.

In another aspect, the disclosed technology relates to a control system network architecture for a fluidic control system, said control system network architecture comprising: a plurality of nodes adapted to control fluid flow to a plurality of controlled endpoint devices, wherein each node of said plurality of nodes comprises one or more spool valves configurable individually to control fluid flow to single-acting controlled endpoint devices or to control fluid flow to a double-acting controlled endpoint device. In some examples, a first group of nodes of said plurality of nodes are physically arranged together in a control block, and wherein said control block comprises a communication module for communicating data messages. In some examples, the communication module operates as a communication gateway for communication of data messages to and from said control block. In some examples, the communication module is configured to convert data messages between a variable length format and a fixed length format. In some examples, the communication module is configured to operate as a repeater for receiving and re-broadcasting data messages. In some examples, said control block comprises a first control block, wherein a second group of nodes of said plurality of nodes are physically arranged together in a second control block, wherein said second control block comprises a communication module for communicating data messages, and wherein said communication module of said first control block and said communication module of said second control block are operative to communicate data messages between said first control block and said second control block. In some examples, said communication module is adapted to communicate data messages via a data communication network. In some examples, said data communication network comprises a Controller Area Network (CAN).

In another aspect, the disclosed technology relates to a control system network architecture for a fluidic control system, said control system network architecture comprising: a node adapted for controlling fluid flow to at least one controlled endpoint device, wherein said node comprises: one or more valve spools, each valve spool fluidically connectable to a single-acting, controlled endpoint device for supplying fluid to the single-acting, controlled endpoint device; a solenoid operable to control the positions of said one or more valve spools; and a controller adapted to control the operation of said solenoid; wherein said one or more valve spools, said solenoid, and said controller are co-located together; and a data communication network configured to communicate data messages to said node. In some examples, said fluid comprises hydraulic fluid. In alternative examples, said fluid comprises compressed air. In some examples, said data communication network comprises a Controller Area Network (CAN). In some examples, a pair of valve spools of said one or more valve spools is fluidically connectable to a double-acting, controlled endpoint device for the supply of fluid to the double-acting, controlled endpoint device. In some examples, said node comprises a first node and said control system network architecture further comprises a plurality of nodes grouped together in a control block. In some examples, said control block comprises a communication module adapted to communicate data messages to and from said nodes of said plurality of nodes.

Other inventive aspects, advantages and benefits of the present invention may become apparent upon reading and understanding the present specification when taken in conjunction with the appended drawings.

DETAILED DESCRIPTION OF EXAMPLE EMBODIMENTS

Figure 1:
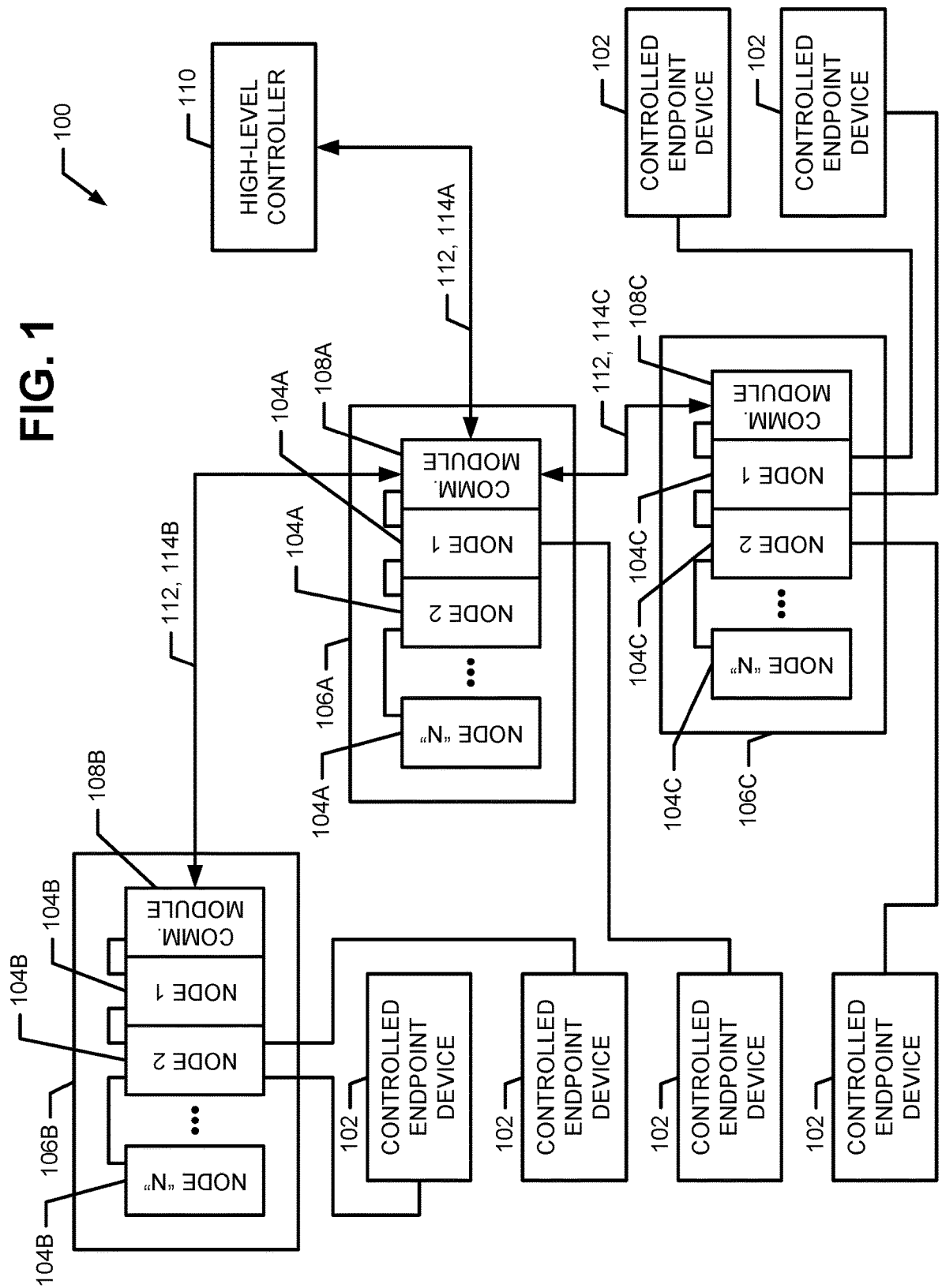
FIG. 1 displays a block diagram representation of a control system network architecture, in accordance with a first example embodiment of the present invention, for a fluidic control system.

Referring now to the drawings in which like elements are identified by like numerals throughout the several views, FIG. 1 displays a block diagram view of a control system network architecture 100, according to a first example embodiment of the present invention, for use in fluidic control systems such as, but not limited to, hydraulic control systems, pneumatic control systems, and other control systems. The control system network architecture 100 (also sometimes referred to herein as the "architecture 100") may be employed in/with a variety of fluidic control systems to control the delivery and distribution of an appropriate fluid to various controlled endpoint devices 102. As used herein, the term "fluid" means and refers to an incompressible fluid or a compressible fluid (such as, but not limited to, hydraulic fluid, oil, air, and water) that is controllably delivered or distributed to a controlled endpoint device 102 that operates in response to receiving such fluid. Also, as used herein, the term "controlled endpoint device 102" means and refers to actuators, motors, and other devices that translate, rotate, move, or otherwise operate in response to receiving a fluid. Thus, for example and not limitation, the control system architecture 100 may be used in one example embodiment with hydraulic control systems such as those present in heavy equipment through which pressurized hydraulic fluid, or oil, is controllably delivered to hydraulic actuators, motors, or other controlled endpoint devices 102. In another example embodiment, the control system architecture 100 may be used with pneumatic control systems such as those present in industrial manufacturing facilities via which compressed air is controllably delivered to pneumatic actuators, motors, or other controlled endpoint devices 102. It should, however, be appreciated and understood that while the architecture 100 may be described herein with reference to hydraulic or pneumatic control systems, the architecture 100 may be used in other fluidic control systems as well.

The control system network architecture 100 comprises a plurality of clustered control-component nodes 104 that are each capable of independently controlling the delivery or distribution of a fluid to one or more controlled endpoint devices 102, depending on the particular application in which the architecture 100 is employed. The clustered control-component nodes 104 are arranged, or grouped, together in a plurality of control blocks 106 that are, typically (although not mandatorily), located near the respective controlled endpoint devices 102 serviced by the clustered control-component nodes 104. Each control block 106 generally includes multiple clustered control-component nodes 104 that are communicatively interconnected (by such as, but not limited to, daisy-chaining) for the communication of data messages between all of the block's clustered control-component nodes 104. Each control block 106 may, depending on the particular application of the architecture 100, also include a communication module 108 that is operative to communicate data messages with other control blocks 108 and/or with a high-level controller 110 (described below) via a data communication network 112 (described below). Alternatively, control blocks 106 that are physically located near one another may be communicatively connected for the communication of data messages therebetween by daisy-chaining such control blocks 106 together and without using communication modules 108. The data messages communicated between control blocks 106 or between a control block 106 and a high-level controller 110 generally include, but are not limited to, data representative of and identifying a clustered control-component node 104, operation modes, fluid delivery demands, or requests for particular data.

Figure 3:
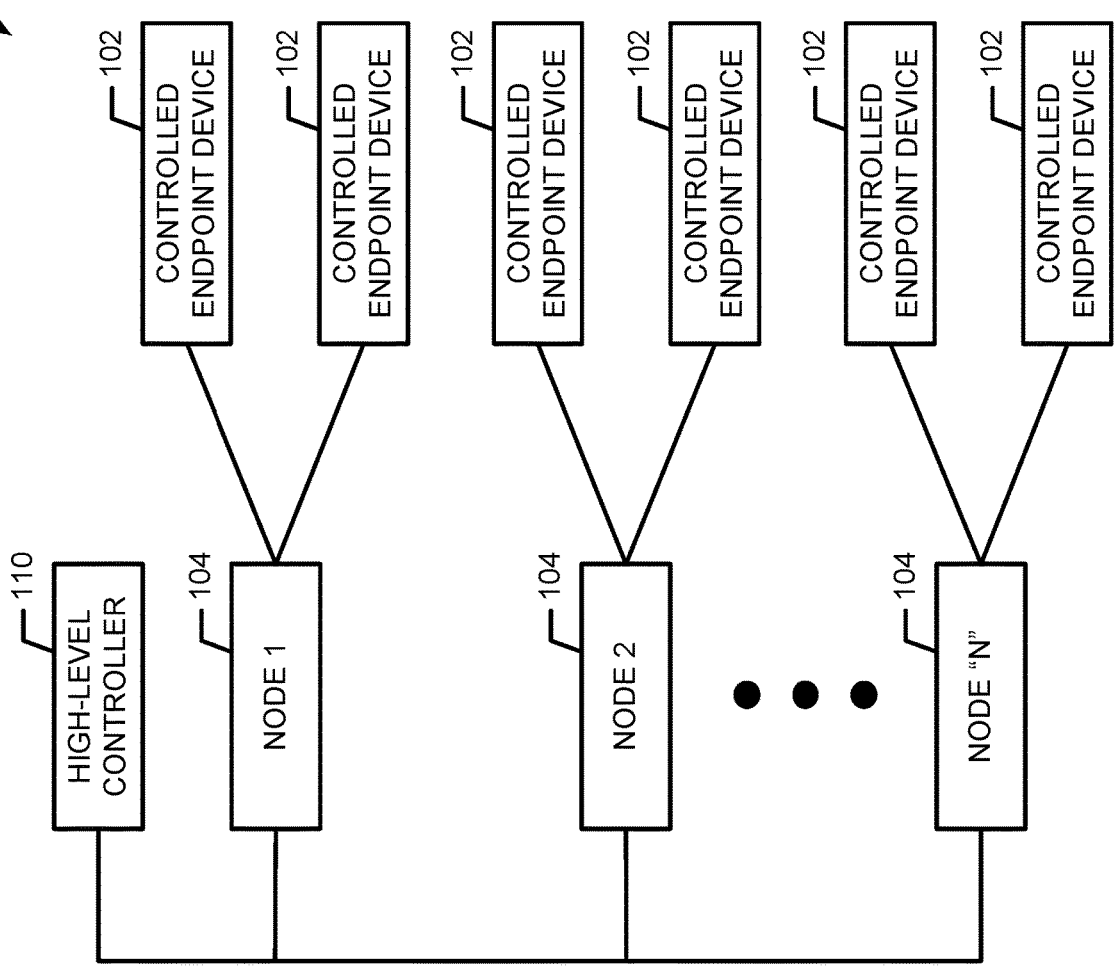
FIG. 3 displays a block diagram representation of a control system network architecture, in accordance with a second example embodiment of the present invention, for a fluidic control system.

As seen in FIG. 1 and in accordance with the first example embodiment, the control system network architecture 100 also comprises high-level controller 110 and a data communication network 112 that communicatively connects the control blocks 106 (and, hence, the clustered control-component nodes 104) to the high-level controller 110 and to other control blocks 106 for the communication of data messages therebetween. In a second example embodiment, the high-level controller 110 may be communicatively connected directly with the clustered control-component nodes 104 (see FIG. 3) for the communication of data messages therebetween. The high-level controller 110 is configured with electronic circuitry adapted to execute software and operate under the control of such software to receive inputs from human machine interface (HMI) devices, sensors, and other components, to generate data messages based at least in part on such inputs, and to communicate the data messages to an appropriate control block 106 and/or clustered control-component node 104 as necessary to cause desired operation of a controlled endpoint device 102.

In accordance with the first example embodiment described herein and as illustrated in FIG. 1, the data communication network 112 comprises a Controller Area Network (CAN). A first control block 106A of the plurality of control blocks 106 is configured with a communication module 108A having electronic circuitry and, perhaps, software that render communication module 108A capable of communicating data messages with the high-level controller 110 and operating as a communication gateway between the high-level controller 110 and the other control blocks 106B, 106C of the plurality of control blocks 106. The communication module 108A is also capable of converting data messages between fixed and variable length formats, depending on whether the data messages are being communicated with the high-level controller 110 or with clustered control-component nodes 104A of the first control block 106A or clustered control-component nodes 104B, 104C of control blocks 106B, 106C. The communication module 108A is connected to the high-level controller 110 for communication via a communication link 114A of the data communication network 112.

The second and third control blocks 106B, 106C of the plurality of control blocks 106, according the first example embodiment described herein, are configured with communication modules 108B, 108C having electronic circuitry and, perhaps, software, thereby rendering communication modules 108B, 108C capable of communicating data messages with the communication module 108A of the first control block 106A. Communication modules 108B, 108C are communicatively connected to communication module 108A via communication links 114B, 114C. Communication modules 108B, 108C are adapted to function merely as repeaters, receiving and rebroadcasting data messages without modifying the content of the data messages. Typically, data messages communicated between the first control block 106A and the high-level controller 110 comprise variable length data messages, while data messages communicated between control blocks 106A, 106B, 106C comprise fixed length data messages. It should be appreciated and understood that while the architecture 100 has been described above with reference to three (3) control blocks 106, the architecture 100 may comprise a greater or lesser number of control blocks in other example embodiments.

Communication modules 108, communication links 114, and both fixed and variable length data messages are all configured, according to the example embodiments, to operate or are formatted, as the case may be, in accordance with Controller Area Network (CAN) specifications and protocols. As such, communication links 114 generally comprise wired cables having a number of conductors, connector configurations, and voltage levels appropriate for a Controller Area Network (CAN). It should, however, be appreciated and understood that communication modules 108, communication links 114, and the fixed and variable length data messages may be configured or be formatted in accordance with other communication network specifications and protocols, including, without limitation, wireless communication network specifications and protocols.

As briefly described above, the clustered control-component nodes 104 of the control blocks 106 are each capable of independently controlling the delivery or distribution of a fluid to one or more controlled endpoint devices 102, depending on the particular control system application in which the architecture 100 is employed. More specifically, each clustered control-component node 104 is operable to, alternatively, control a double-acting, controlled endpoint device 102 (including, but not limited to, a double-acting hydraulic or pneumatic cylinder actuator), two single-acting, controlled endpoint devices 102 (including, without limitation, single-acting hydraulic or pneumatic cylinder actuators), or two rotary, controlled endpoint devices 102 (including, without limitation, two hydraulic or pneumatic motors).

Figure 2:
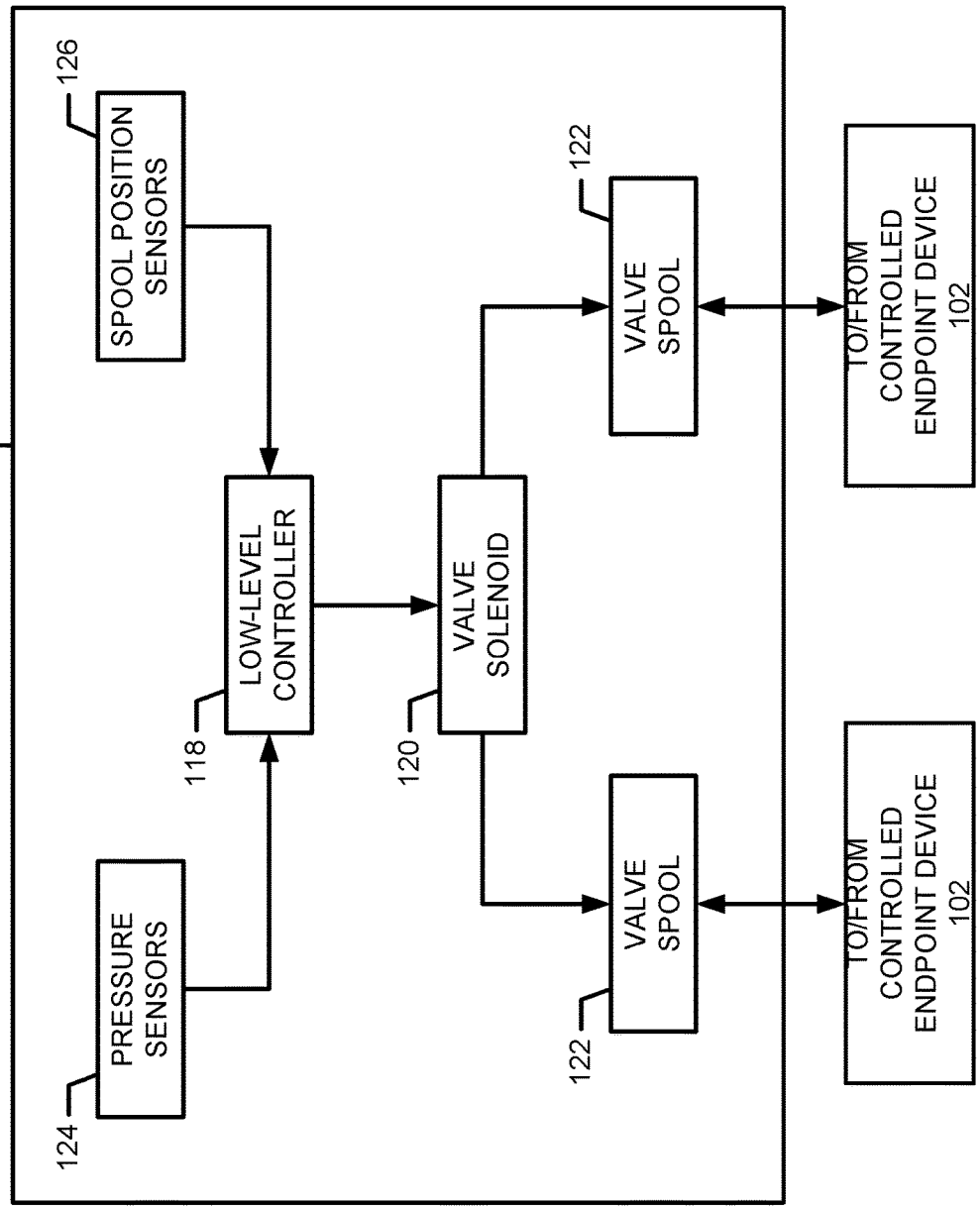
FIG. 2 displays a block diagram representation of a clustered control-component node of the control system network architecture of FIG. 1.

Referring now to FIG. 2, each clustered control-component node 104 comprises a co-located plurality of clustered control-components 116 including, a low-level controller 118, a valve solenoid 120, and a plurality of valve spools 122. The valve solenoid 120 may, in some example embodiments, comprise part of a pilot valve that is operative to control the plurality of valve spools 122. In other example embodiments, the valve solenoid 120 and plurality of valve spools 122 may comprise parts of a direct-acting valve. In certain example embodiments, each clustered control-component node 104 may further comprise one or more fluid pressure sensors 124 and one or more valve spool position sensors 126. When present, the fluid pressure sensors 124 and valve spool position sensors 126 are electrically connected to the low-level controller 118. The fluid pressure sensors 124 are operative to measure fluid pressures at various locations (such as, but not limited to, at the inlet and outlet ports of a pilot valve, at the inlet and outlet ports of a valve spool 122, and at supply tanks or reservoirs) and to provide the low-level controller 118 with data representative of such pressures during operation. The valve spool position sensors 126, if present, are operative to determine the positions of the valve spools 122 and to provide the low-level controller 118 with data corresponding to such positions during operation. Using the positions of the valve spools 122, fluid flow rates may be calculated.

The low-level controller 118 of each clustered control-component node 104 is configured to locally control the operation of the other clustered control-components 116 in response to receiving data messages from the high-level controller 110 and data, or signals, from fluid pressure sensors 124 and valve spool position sensors 126, if present. The low-level controller 118 has electronic circuitry and, perhaps, software or firmware executed by a processing device (such as, but not limited to, a digital signal processor, microprocessor, microcontroller, or similar device) of such electronic circuitry that render the clustered control-component node 104 capable of: receiving data messages from high-level controller 110 or other control blocks 106 via the control block's communication module 108 or daisy-chaining between control blocks 106 as in the first example embodiment, or via direct communication connection with the high-level controller 110 as in the second example embodiment; generating and sending data messages to high-level controller 110 via the control block's communication module 108 or daisy-chaining between control blocks 106 as in the first example embodiment, or via direct communication connection with the high-level controller 110 as in the second example embodiment; identifying content of received data messages applicable to the clustered control-component node 104; parsing and interpreting the applicable content of received data messages; receiving data or signals from, if present, fluid pressure sensors 124 or valve spool position sensors 126; and, producing and sending electrical signals to a solenoid 120 of a pilot valve or direct-acting valve, as the case may be, in order to control the operation of the pilot valve or direct-acting valve, and subsequent movement of valve spools 122 to, as appropriate, direct the flow of fluid to and, possibly, from one or more controlled endpoint devices 102 coupled to, and for fluid communication with, the valve spools 122.

The solenoid 120 of each clustered control-component node 104 is adapted to cause appropriate operation of the valve spools 122 in response to receiving electrical signals from the low-level controller 118. The solenoid 120 is electrically connected to the low-level controller 118 for receiving such electrical signals. If the solenoid 120 is embodied as part of a pilot valve in a particular application of the architecture 100, the pilot valve is also fluidically connected to the valve spools 122 for the flow of fluid between the pilot valve and each of the valve spools 122. In response to receiving electrical signals from the low-level controller 118, the solenoid 120 of the pilot valve is energized or de-energized, thereby moving a poppet or spool of the pilot valve and causing pilot fluid to be supplied to or returned from the valve spools 122. Alternatively, if the solenoid 120 is embodied as part of a direct-acting valve in a particular application of the architecture 100, the solenoid 120 of the direct-acting valve is energized or de-energized in response to receiving electrical signals from the low-level controller 118, causing appropriate movement of a valve spool 122 of the direct-acting valve.

The valve spools 122 of each clustered control-component node 104 are adapted to cause the delivery of working fluid to or the return of working fluid from, controlled endpoint devices 102 in response to operation of the solenoid 120, thereby causing desired operation of the controlled endpoint devices 102. Each valve spool 122 may be fluidically connected to a double-acting, controlled endpoint device 102 (including, but not limited to, a double-acting hydraulic or pneumatic cylinder actuator), to two, single-acting, controlled endpoint devices 102 (including, without limitation, single-acting hydraulic or pneumatic cylinder actuators), or to two rotary, controlled endpoint devices 102 (including, without limitation, two hydraulic or pneumatic motors).

Because each clustered control-component node 104 comprises clustered control-components 116, including, at least two valve spools 122, a solenoid 120, and a low-level controller 118 configured to control operation of the solenoid 120 and, hence, of multiple valve spools 122, each clustered control-component node 104 is adapted to control multiple functions or services required by one or more controlled endpoint devices 102. Such clustering allows the cost of the low-level controller 118 to be distributed across or among several hydraulic or pneumatic, controlled endpoint devices 102, greatly reducing the overall cost differential between centralized and decentralized architectures. Also, such clustering allows calibrations to be performed before final assembly of hydraulic or pneumatic system components on a finished machine, device, or system, thereby minimizing post-assembly calibrations. Additionally, such clustering allows greater software configurability and reduces the amount of wiring, thereby reducing the number of possible failure locations and improving system reliability. It should be appreciated and understood that while the described example embodiments of the control system network architecture 100 include clustered control-component nodes 104 each having a solenoid 120 and multiple valve spools 122, each clustered control-component node 104 may include multiple solenoids 120 with each solenoid 120 controlling one or more valve spools 122, thereby enabling each clustered control-component node 104 of a control block 106 to service increased numbers of single-acting, controlled endpoint devices 102 and double-acting, controlled endpoint devices, while distributing the cost of the low-level controller 118 across an even greater number of controlled endpoint devices 102 and further decreasing the amount of wiring and, hence, decreasing the number of possible failure locations.

Whereas the present invention has been described in detail above with respect to example embodiments thereof, it should be appreciated that variations and modifications might be effected within the spirit and scope of the present invention.

What is claimed is:

1. A control system network architecture for a fluidic control system, said control system network architecture comprising:

a plurality of nodes adapted to control fluid flow to a plurality of controlled endpoint devices, wherein each node of said plurality of nodes is configurable to independently control fluid flow to multiple single-acting controlled endpoint devices or to a double-acting controlled endpoint device;

a first group of nodes of the plurality of nodes clustered together and communicatively interconnected in a first control block, the first control block including a communication module for communicating data messages;

a second group of nodes of the plurality of nodes clustered together and communicatively interconnected in a second control block; and a controller communicatively connected to at least the first control block;

wherein the communication module of the first control block communicates the data messages with the controller and operates as a communication gateway between the controller and the second control block.

2. The control system network architecture of claim 1, wherein each node of said plurality of nodes comprises a solenoid, one or more valve spools independently controllable by said solenoid, and a local controller operable to control said solenoid.

3. The control system network architecture of claim 2, wherein said solenoid, said one or more valve spools, and said local controller are co-located physically.

4. The control system network architecture of claim 2, wherein said solenoid is embodied in a pilot valve.

5. The control system network architecture of claim 2, wherein said solenoid is embodied in a direct-acting valve.

6. The control system network architecture of claim 1, wherein each node of said plurality of nodes is uniquely identifiable for communication of data via a data communication network.

7. The control system network architecture of claim 6, wherein said data communication network comprises a Controller Area Network (CAN).

8. The control system network architecture of claim 1, wherein each node of said plurality of nodes is individually addressable for data communications.

9. The control system network architecture of claim 1, wherein the first group of nodes are daisy-chained for data communication in the first control block, and the second group of nodes are daisy-chained for data communication in the second control block.

10. The control system network architecture of claim 1, further comprising a third group of nodes of the plurality of nodes clustered together and communicatively interconnected in a third control block.

11. The control system network architecture of claim 10, wherein at least the second and third control blocks are daisy-chained together to communicate data messages between the second and third control blocks.

12. The control system network architecture of claim 10, wherein the second and third control blocks each include a communication module adapted to communicate data messages between the second and third control blocks and the first control block.

13. A control system network architecture for a fluidic control system, said control system network architecture comprising:

a plurality of nodes adapted to control fluid flow to a plurality of controlled endpoint devices, wherein each node of said plurality of nodes comprises a plurality of spool valves configurable individually to control fluid flow to single-acting controlled endpoint devices or to control fluid flow to a double-acting controlled endpoint device;

a first group of nodes of the plurality of nodes clustered together and communicatively interconnected in a first control block, the first control block including a communication module for communicating data messages;

a second group of nodes of the plurality of nodes clustered together and communicatively interconnected in a second control block; and a controller communicatively connected to at least the first control block;

wherein the communication module of the first control block communicates the data messages with the controller and operates as a communication gateway between the controller and the second control block.

14. The control system network architecture of claim 13, wherein said communication module is configured to convert data messages between a variable length format and a fixed length format.

15. The control system network architecture of claim 13, wherein said communication module is configured to operate as a repeater for receiving and re-broadcasting data messages.

16. The control system network architecture of claim 13, wherein said second control block comprises a communication module for communicating data messages, and wherein said communication module of said first control block and said communication module of said second control block are operative to communicate data messages between said first control block and said second control block.

17. The control system network architecture of claim 13, wherein said communication module is adapted to communicate data messages via a data communication network.

18. The control system network architecture of claim 17, wherein said data communication network comprises a Controller Area Network (CAN).

19. A control system network architecture for a fluidic control system, said control system network architecture comprising:

a high-level controller;

a node adapted for receiving data messages from the high-level controller and controlling fluid flow to at least one controlled endpoint device, the node being clustered together with a plurality of nodes in a control block, wherein said node comprises:

a plurality of valve spools, each valve spool fluidically connectable to a single-acting, controlled endpoint device for supplying fluid to the single-acting, controlled endpoint device;

a solenoid operable to control the positions of said plurality of valve spools; and a local controller adapted to control the operation of said solenoid;

wherein said plurality of valve spools, said solenoid, and said local controller are clustered control-components co-located together; and a data communication network configured to communicate data messages to said node;

wherein the control block operates as a communication gateway between the high-level controller and a second control block.

20. The control system network architecture of claim 19, wherein said fluid comprises hydraulic fluid.

21. The control system network architecture of claim 19, wherein said fluid comprises compressed air.

22. The control system network architecture of claim 19, wherein a pair of valve spools of said plurality of valve spools is fluidically connectable to a double-acting, controlled endpoint device for the supply of fluid to the double-acting, controlled endpoint device.

23. The control system network architecture of claim 19, wherein said data communication network comprises a Controller Area Network (CAN).

24. The control system network architecture of claim 19, wherein said control block comprises a communication module adapted to communicate data messages to and from said plurality of nodes.

\* \* \* \* \*